Sept. 25, 1934.    H. R. SIMONDS    1,975,053
METHOD OF BALANCING ABRASIVE WHEELS AND WHEELS THEREBY BALANCED
Filed Jan. 19, 1931
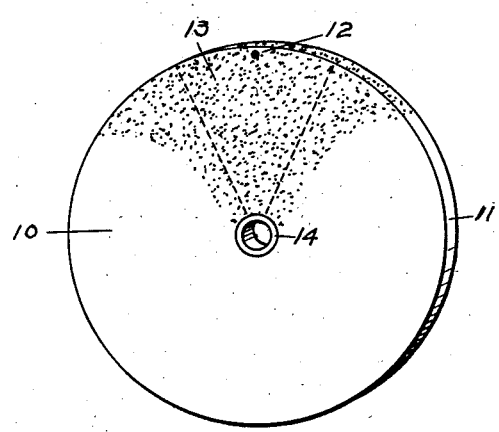
Inventor
Herbert R. Simonds,
By Fassett and Fassett,
Attorneys Patented Sept. 25, 1934

1,975,053

UNITED STATES PATENT OFFICE 1,975,053

METHOD OF BALANCING ABRASIVE WHEELS AND WHEELS THEREBY BALANCED

Herbert R. Simonds, Dayton, Ohio, assignor to Simonds Worden White Company, Dayton, Ohio, a corporation of Ohio Application January 19, 1931, Serial No. 509,694

12 Claims. (Cl. 51—278)

REISSUED

This invention relates to abrasive or grinding wheels or the like, and it has particular reference to methods of balancing such wheels, so that when they rotate at high velocities they will not vibrate.

Notwithstanding numerous methods have been devised calculated to produce abrasive wheels that do not require balancing a large percentage of the wheels made are out of balance. Balancing abrasive wheels has always been a difficult problem, and until now there has been no practical method of balancing a wheel other than the use of weights close to the axis of the wheel.

Abrasive wheels, frequently called "emery" wheels, are made of granular abrasive material such as silicon carbide or aluminous oxide, which material may be bonded with various materials, such as vitreous clays, shellac, and synthetic resins. In most all cases the wheels are very porous or foraminous. That is, there are interstices between the grains of abrasive material, which being connected one to another form numerous tortuous or circuitous passages or foramina, running from the exterior down deep into the wheel, and in many cases running quite through the wheel. I take advantage of this porosity in balancing abrasive wheels, as I shall now explain, with the aid of the accompanying drawing, which depicts an abrasive wheel of a well known form.

For the purposes of this application I shall call the flat surface of the wheel, indicated at 10, and the corresponding flat surface of the opposite side of the wheel, the faces of the wheel, and the periphery 11 of the wheel will be called its edge. At its center the wheel is provided with a bush 14, usually made of lead or the like. As methods of determining which is the light and which the heavy side of the wheel, and for determining when the wheel is in balance, are well known, it is not necessary to describe any method. Assuming that the dot 12 near its edge marks the center of the light side of the wheel, and that a lump of clay weighing two ounces stuck to the edge opposite the dot just balanced the wheel, I proceed in the following manner to permanently balance the wheel.

I lay out a sector 13, shown with dotted lines, on one face, or both faces, of the wheel, with the point represented by the dot 12 in the center. Laying the wheel down on a level surface I pour a mixture of pulverized silica and water on the sector 13. Acting as a vehicle the water carries the silica down into the pores of the wheel, where the silica becomes permanently lodged. Turning the wheel over I pour a similar mixture on the other face within the sector 13. Eventually the water dries out, leaving the silica in the pores.

The quantity of silica to be used is determined by the weight to be added, this in turn being indicated by the weight of the lump of clay that balanced the wheel. The clay having been stuck to the edge of the wheel, it is obvious that a quantity of silica weighing more than the clay will be necessary, because of the silica being nearer the axis of the wheel. Just how much additional weight of silica will be necessary depends upon the diameter of the wheel. This can be determined mathematically or empirically. If after treating a wheel it is found that too little silica has been introduced more may be added in another treatment. If too much has been introduced a little may be introduced on the opposite side, formerly the heavy side of the wheel. This, however, will seldom be necessary, as a workman soon acquires skill and judgment in treating wheels, which enables him to effect a practically perfect balance in the first treatment.

The degrees included in the sector 13 may be varied according to the amount of weight to be added to the light side of the wheel. If considerable weight is needed a sector of considerable degree may be laid out; if only a small amount of weight is needed to balance the wheel the sector may be of correspondingly small degree.

While silica is a very satisfactory material for balancing wheels by my method, my invention is not limited to the use of silica. Nor is it limited to water as a vehicle for introducing the material into the pores of the wheel. It is important, however, to use a material and vehicle which will not affect the bonding material in the wheel. Nor is the practice of my method limited to the vehicular method of introducing the counterweighting material into the pores of the wheel, for the material will balance the wheel effectually however it may be introduced.

While I have only illustrated my invention in connection with an ordinary straight wheel, it is obvious that the invention is applicable to all forms of wheels.

One of the advantages of using silica, and water as a vehicle, is that the grinding properties of the wheel are not impaired. The water evaporates, leaving the dry silica in the pores of the wheel. As the wheel wears down and opens the pores at the grinding surface, the silica contained therein falls out, or it is thrown out by centrifugal force, leaving the grinding surface in normal condition, as if no foreign matter had ever been deposited in the exposed pores. Another advantage is that the wheel remains in balance as it wears down, which is not the case where wheels are balanced by adding weight near the axis of the wheel.

Having fully described my invention and the preferred method of practicing it, I claim:

1. The method of balancing an abrasive wheel, which consists in introducing into the pores of the wheel, on the light side of its axis, a sufficient quantity of a substance having weight to make the weight of the light side equal to the weight of the heavy side, said substance being adapted to fall out of the pores as said pores become uncovered by wearing away of the wheel.

2. The method of balancing an abrasive wheel, which consists in introducing into the pores of the wheel, on the light side of its axis, a sufficient quantity of silica to make the weight of the light side equal the weight of the heavy side.

3. The method of balancing an abrasive wheel, which comprises introducing into the pores of the wheel by means of a liquid vehicle, on the light side of its axis, a sufficient quantity of a substance having weight to make the weight of the light side equal the weight of the heavy side when the liquid vehicle has dried out, said substance being adapted to fall out of the pores as said pores become uncovered by wearing away of the wheel.

4. The method of balancing an abrasive wheel, which comprises introducing into the pores of the wheel, on the light side of its axis, a sufficient quantity of silica in a liquid vehicle to make the weight of the light side equal the weight of the heavy side when the liquid has dried out.

5. The method of balancing an abrasive wheel, which comprises introducing into the pores of the wheel, on the light side of its axis, a mixture of silica and water, in sufficient quantity to make the weight of the light side equal the weight of the heavy side when the water evaporates.

6. The method of balancing an abrasive wheel, which comprises introducing into the pores of a sector of the wheel, on the light side of its axis, a sufficient quantity of a substance having weight to make the weight of the light side equal the weight of the heavy side, said substance being adapted to fall out of the pores as said pores become uncovered by wearing away of the wheel.

7. An abrasive wheel, into the pores of a sectoral division of which, on the light side of its axis, a substance has been introduced whereby to make the weight of the light side equal the weight of the heavy side, thereby balancing the wheel, said substance being adapted to fall out of the pores as said pores become uncovered by wearing away of the wheel.

8. An abrasive wheel, into the pores of which, on the light side of its axis, a substance has been introduced whereby to make the weight of the light side equal the weight of the heavy side, thereby balancing the wheel, said substance being adapted to fall out of the pores as said pores become uncovered by wearing away of the wheel.

9. An abrasive wheel, into the pores of which, on the light side of its axis, a quantity of silica has been introduced whereby to make the weight of the light side equal the weight of the heavy side, thereby balancing the wheel.

10. An abrasive wheel, into the pores of a sectoral division of which, on the light side of its axis, a quantity of silica has been introduced whereby to make the weight of the light side equal the weight of the heavy side, thereby balancing the wheel.

11. The method of balancing an abrasive wheel, which method comprises introducing into pores of the wheel, on the light side of its axis, a sufficient quantity of a substance having weight to make the weight of the light side equal the weight of the heavy side, said substance being introduced into the pores with a vehicle which thereafter vanishes, said substance being adapted to fall out of the pores as said pores become uncovered by wearing away of the wheel.

12. The method of balancing an abrasive wheel, which method comprises introducing into pores of the wheel, on the light side of its axis, a sufficient quantity of silica to make the weight of the light side equal the weight of the heavy side, said silica being introduced into the pores with a vehicle which thereafter vanishes.

HERBERT R. SIMONDS.